United States Patent
Nakashima et al.

(10) Patent No.: US 7,335,904 B2
(45) Date of Patent: Feb. 26, 2008

(54) PROCESS FOR READ-OUT OF RADIATION IMAGE

(75) Inventors: Tomoaki Nakashima, Kanagawa (JP); Yuichi Hosoi, Kanagawa (JP); Munetaka Kato, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 11/238,048

(22) Filed: Sep. 29, 2005

(65) Prior Publication Data

US 2007/0241294 A1  Oct. 18, 2007

(30) Foreign Application Priority Data

Sep. 29, 2004 (JP) .............................. 2004-285377

(51) Int. Cl.
*G01N 23/04* (2006.01)
*G03B 42/08* (2006.01)

(52) U.S. Cl. ..................... 250/584; 250/585; 250/586

(58) Field of Classification Search ............... 250/580, 250/581, 582, 584, 585, 586, 588, 484.4
See application file for complete search history.

(56) References Cited

U.S. PATENT DOCUMENTS

| | | | | |
|---|---|---|---|---|
| 5,371,377 A * | 12/1994 | Struye et al. | ............... | 250/588 |
| 6,495,850 B1 * | 12/2002 | Struye et al. | ............... | 250/586 |
| 6,512,240 B1 * | 1/2003 | Leblans et al. | ............. | 250/588 |
| 2002/0104974 A1 * | 8/2002 | Hosoi | ........................ | 250/584 |
| 2003/0034458 A1 * | 2/2003 | Isoda et al. | ............... | 250/484.4 |
| 2003/0047697 A1 * | 3/2003 | Iwabuchi et al. | ........... | 250/584 |
| 2005/0051746 A1 * | 3/2005 | Iwabuchi et al. | ........... | 250/580 |
| 2006/0027770 A1 * | 2/2006 | Struye et al. | ............... | 250/586 |
| 2006/0065862 A1 * | 3/2006 | Takasu | ....................... | 250/580 |

* cited by examiner

*Primary Examiner*—David Porta
*Assistant Examiner*—Faye Boosalis
(74) *Attorney, Agent, or Firm*—Sughrue Mion, PLLC

(57) ABSTRACT

A process for reading a radiation image out of a radiation image storage panel which has a phosphor layer comprising columnar crystals of europium activated cesium halide stimulable phosphor in which a radiation image is recorded, is performed by the steps of: exposing the storage panel to stimulating light in a stimulating energy of 2 to 10 $J/m^2$; photoelectrically collecting a stimulated emission given off from the storage panel; and converting the collected emission into a radiation image in the form of a series of electric image signals.

5 Claims, 4 Drawing Sheets

PROCESS FOR READ-OUT OF RADIATION IMAGE

FIELD OF THE INVENTION

The present invention relates to a process for reading out a radiation image from a radiation image-recorded radiation image storage panel having an energy-storing phosphor layer.

BACKGROUND OF THE INVENTION

When an energy-storing phosphor (e.g., stimulable phosphor, which gives off stimulated emission) is exposed to radiation such as X-rays, the phosphor absorbs and stores a portion of the radiation energy. The phosphor then emits stimulated emission according to the level of the stored energy when it is exposed to electromagnetic wave such as visible or infrared light (i.e., stimulating light). A radiation image recording and reproducing method utilizing the energy-storing phosphor has been widely employed in practice. In that method, a radiation image storage panel, which is a sheet comprising the energy-storing phosphor, is used. The method comprises the steps of: exposing the storage panel to radiation having passed through an object or having radiated from an object, so that radiation image information of the object is temporarily recorded in the panel; sequentially scanning the panel with stimulating light such as a laser beam to emit stimulated light; and photoelectrically detecting the emitted light to obtain electric image signals. The storage panel thus treated is subjected to a step for erasing radiation energy remaining therein, and then stored for the use in the next recording and reproducing procedure. Thus, the radiation image storage panel can be repeatedly used.

The radiation image storage panel (often referred to as energy-storing phosphor sheet) has a basic structure comprising a support and a phosphor layer provided thereon. However, if the phosphor layer is self-supporting, the support can be omitted. Further, a protective layer is normally provided on the free surface (surface not facing the support) of the phosphor layer to keep the phosphor layer from chemical deterioration or physical damage.

Various kinds of energy-storing phosphor layers are known. For example, the phosphor layer can comprise a binder and energy-storing phosphor particles dispersed therein. Alternatively, the phosphor layer can comprise agglomerate of an energy-storing phosphor without binder. The binderless phosphor layer can be formed by a gas phase-accumulation method or by a firing method. For example, in the gas phase-accumulation method, the phosphor or material thereof is vaporized (or sputtered) and accumulated on a substrate to form a layer of the phosphor in the form of columnar crystals. Thus prepared phosphor layer consists of only the phosphor, and there are cracks among the columnar crystals of phosphor. Accordingly, the stimulating light can be applied efficiently enough and the emission can be collected also efficiently enough to improve the sensitivity. In addition, since the stimulating light is kept from scattering horizontally, a radiation image of high sharpness can be obtained.

JP-A-2001-74898 discloses a process for read-out of radiation image and an apparatus for the process in the disclosed process, a photo-stimulable phosphor screen comprising divalent europium activated cesium halide (chloride or bromide) phosphor is used. The screen has a surface area not larger than $S_{max}$. After a radiation image beforehand recorded in the screen is read out, the screen is irradiated with an erasing light in the wavelength region of 300 to 1,500 nm so as to erase the radiation energy remaining in the screen. The erasing light is emitted from a light source composition having an electric power not larger than $S_{max} \times 1$ J. Examples in the publication teach that the screen comprising $CsBr:Eu^{2+}$ phosphor has better erasing characteristics than the conventional $BaFBr:Eu^{2+}$ phosphor-containing screen and, accordingly, that the radiation energy remaining therein can be erased well with an erasing light emitted from a source of relatively small power.

As described above, a radiation image storage panel is repeatedly used in the radiation image recording and reproducing method. The erasing step (in which the whole surface of the storage panel is irradiated with an erasing light) is, therefore, generally carried out after the read-out procedure or before the next recording procedure, so as to erase radiation energy of the previous radiation image still remaining in the storage panel and, in addition, to erase radiation energy given by radioisotopes inadvertently incorporated into the panel or by environmental radiation. In practice, it is required that the previously recorded image had not to appear when the next radiation image read-out procedure is performed. From this point of view, it is desired that a storage panel be excellent in the erasing property (that is, the radiation energy remaining therein be readily removable using an erasing light of relatively small energy).

A reading apparatus for reading a radiation image out of the storage panel is generally equipped with erasing means for the erasing step. In order to shorten the period of time for erasing, to reduce the weight and size of the apparatus and to reduce the operation cost, the amount of the erasing light (illuminance×time) preferably is as small as possible.

SUMMARY OF THE INVENTION

It is an object of the present invention to provide a process for read-out of radiation image, whereby the erasing property can be improved ant the amount of erasing light can be reduced without lowering the sensitivity of radiation image storage panel.

The present applicants have studied a radiation image storage panel having a phosphor layer comprising columnar crystals of europium activated cesium halide (CsX:Eu in which X is a halogen) stimulable phosphor, and found that the erasing property of the storage panel depends on stimulating energy of the stimulating light applied to the storage panel in the image read-out procedure. On the basis of this finding, the applicants have found that, if the energy of the stimulating light is controlled in a specific range, the erasing property can be improved and the amount of the erasing light can be reduced without impairing the radiation image-reproducing performance of the storage panel.

The present invention resides in a process for reading a radiation image out of a radiation image storage panel which has a phosphor layer comprising columnar crystals of europium activated cesium halide stimulable phosphor in which a radiation image is recorded, which comprises the steps of:

exposing the storage panel to stimulating light in a stimulating energy of 2 to 10 $J/m^2$;

photoelectrically collecting a stimulated emission given off from the storage panel; and converting the collected emission into a radiation image in the form of a series of electric image signals.

In this specification, the "stimulating energy" of a stimulating light here means a stimulating energy that the surface of radiation image storage panel receives.

The process of the invention improves the erasing property without impairing the radiation image-reproducing performance of a radiation image storage panel. In other words, according to the invention, radiation energy remaining in the storage panel after the radiation image is read out can be readily removed with a small amount of an erasing light. Accordingly, the process of the invention can contribute to speeding up the read-out procedure including the erasing step and also to reducing the weight and size of the radiation image-reading apparatus equipped with erasing means.

DETAILED DESCRIPTION OF THE INVENTION

Figure 1:
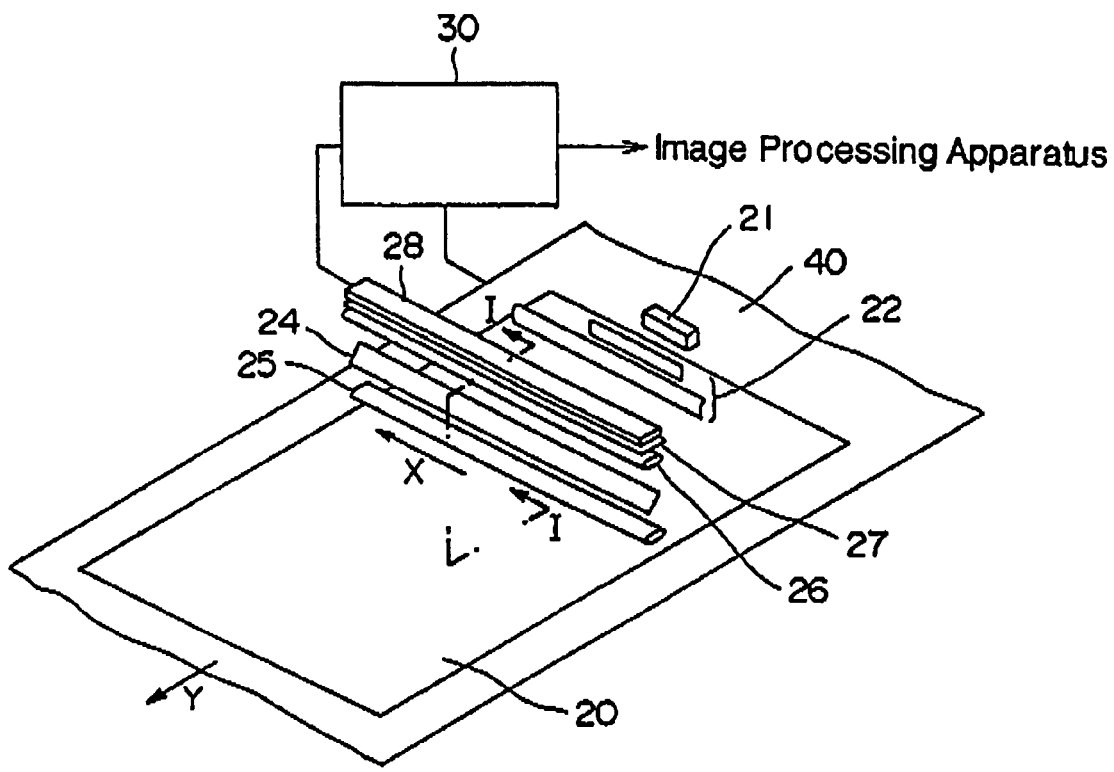
FIG. 1 is a sketch schematically illustrating an example of reading units in the radiation image-reading apparatus for performing the process of the invention.

In the process of the invention, the radiation image storage panel after the radiation image is read out is preferably irradiated utilizing an erasing light of 40,000 to 90,0001 lx·s so that the radiation energy remaining the panel can be erased.

The europium activated cesium halide stimulable phosphor is preferably represented by the formula of CsBr:Eu.

The stimulating light is preferably a laser beam. The stimulated emission given off from the storage panel is preferably read out photoelectrically by means of a line sensor composed of plural photoelectric converting elements arranged linearly.

The process of the invention is explained below in detail with reference to the attached drawings.

The radiation image storage panel used in the invention has a phosphor layer comprising an europium activated-cesium halide stimulable phosphor in the form of columnar crystals.

The europium activated cesium halide stimulable phosphor is, for example, represented by the following formula (I):

$$CsX \cdot aM^{II}{}'X'_2 \cdot bM^{III}X''_3 : zEu \qquad (I)$$

in which each of X, X' and X" is independently at least one halogen selected from the group consisting of F, Cl, Br and I; $M^{II}$ is at least one alkaline earth metal or divalent metal selected from the group consisting of Be, Mg, Ca, Sr, Ba, Ni, Cu, Zn and Cd; $M^{III}$ is at least one rare earth element or trivalent metal selected from the group consisting of Sc, Y, La, Ce, Pr, Nd, Pm, Sm, Eu, Gd, Tb, Dy, Ho, Er, Tm, Yb, Lu, Al, Ga and In; and a, b and z are numbers satisfying the conditions of $0 \leq a < 0.5$, $0 \leq b < 0.5$ and $0 < z < 1.0$, respectively.

The phosphor of the formula (I) preferably contains at least Br as X. The number represented by z in the formula (I) preferably satisfies the condition of $1 \times 10^{-4} \leq z \leq 0.1$.

The phosphor layer comprising columnar crystals of stimulable phosphor is known, and can be formed according to various known gas phase-accumulation methods such as a vapor-deposition method with a resistance heater or with an electron beam, a sputtering method or a CVD method.

For example, according to the vapor deposition method, a layer of deposited phosphor can be formed from an evaporation source by a single deposition process or from two or more evaporation sources by a multi-vapor deposition (co-deposition) process. The evaporation source comprises the above energy-storing phosphor or materials thereof. The vapor deposition process comprises the steps of: heating to vaporize one or more evaporation sorrces by means of a resistance heater or an electron beam, and depositing and accumulating the vapor on a substrate to form a phosphor layer. In the process, the vacuum evaporation-deposition apparatus is evacuated to give a medium vacuum of 0.1 to 10 Pa or a high vacuum of $1 \times 10^{-5}$ to $1 \times 10^{-2}$ Pa. During the deposition procedure, the substrate may be heated or cooled. The temperature of the substrate is generally in the range of 20 to 350° C., preferably in the range of 100 to 300° C. The deposition rate, which means how fast the phosphor is deposited and accumulated on the substrate, is generally in the range of 0.1 to 1,000 µm/minute, preferably in the range of 1 to 100 µm/minute. The above vapor-deposition procedure can be repeated twice or more to form a phosphor layer consisting of two or more sub-layers. After the deposition procedure is completed, the formed layer can be subjected to heating treatment (annealing treatment). The thus-formed phosphor layer consists of phosphor in the form of columnar crystals grown almost in the thickness direction. The phosphor layer consists of only the phosphor, and there are cracks among the columnar crystals. The thickness of the phosphor layer is in the range of normally 50 µm to 1 mm, preferably 200 µm to 700 µm though depending on various factors such as the aimed characteristics of the panel, means and conditions of the deposition process.

The radiation image storage panel used in the invention has a basic structure comprising a support (substrate) and a thereon-provided phosphor layer formed by the gas phase-accumulation method. On the phosphor layer, a protective layer is preferably provided to keep the phosphor layer from chemical deterioration or physical damage. Further, the storage panel can be formed in any of various known structures. For example, the storage panel can have various auxiliary layers such as a light-reflecting layer or may have a sealed structure to protect the phosphor layer from deterioration caused by hygroscopic moisture.

Figure 2:
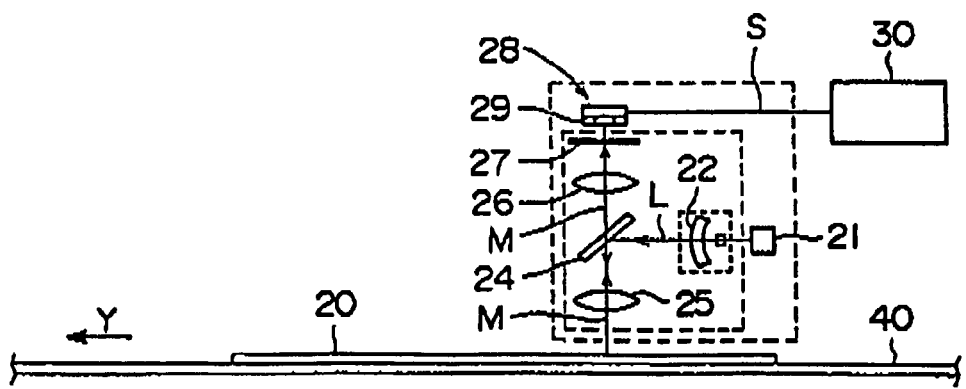
FIG. 2 is a sectional view of the units shown in FIG. 1 taken along I-I line.

The process of the invention can be performed by means of the radiation image-reading apparatus shown in FIGS. 1 and 2.

FIG. 1 is a sketch schematically illustrating an example of reading units in the radiation image-reading apparatus for performing the process of the invention, and FIG. 2 is a sectional view of the units shown in FIG. 1 taken along I-I line.

In FIGS. 1 and 2, a radiation image storage panel 10 or 20 comprises a support and a phosphor layer comprising CsX: Eu stimulable phosphor in the form of columnar crystals, as described above. The storage panel 20 is beforehand exposed to a radiation (such as X-rays) having passed through an object, and hence a radiation image of the object is recorded and stored in the storage panel 20. The storage panel 20 is so placed on a transferring belt 40 that the phosphor layer is placed upside. The transferring belt 40 moves in the direction shown by an arrow Y, to transfer the storage panel 20. The transferring speed of the storage panel 20 is identical with the moving speed of the belt 40, and is input into an image-reading means 30.

On the other hand, a broad area laser (hereinafter often referred to as BLD) 21 linearly emits stimulating light L almost parallel to the surface of the storage panel 20. The stimulating light L is focused through a cylindrical lens 22, and reflected by a dichroic mirror 24 placed at the angle of 45° to the panel 20. The stimulating light reflected by the mirror 24 then proceeds perpendicularly to the storage panel 20, and passes through a distributed index lens array (an array of many distributed index lenses, hereinafter referred to as "first SE lens array") 25 to be focused on the storage panel 20 linearly in the direction shown by an arrow X.

As described later, the stimulating light L emitted from the SW 21 gives a stimulating energy in the range of 2 to 10 J/m$^2$ on the surface of the storage panel 20.

The linearly focused stimulating light L is perpendicularly applied to the panel 20, and thereby a stimulated emission M is given off from the applied area and from the neighbor thereof. The emission M has an intensity according to the stored radiation image. The stimulated emission M is converted into parallel rays through the first SELFOC lens array 25, and passes through the dichroic mirror 24. The emitted rays M then pass through a second SELFOC lens array 26, to be focused on light-receiving faces of photoelectric converting elements 29 constituting a line sensor 28 placed just above the area on which the stimulating light are focused. In this way, a radiation image from the storage panel 20 is isometrically focused on the elements 29.

The line sensor 28 comprises many (for example, 1,000 or more) photoelectric converting elements 29 regularly arrayed in the direction X. Examples of the photoelectric converting element 29 include an amorphous silicon sensor, a CCD sensor, a CCD with back illuminator and MOS image sensor. Each converting element one-to-one corresponds to each pixel. Since the line sensor 28 is placed right above the area on which the stimulating light L is focused, the stimulated emission almost perpendicularly can be efficiently collected. Consequently, the efficiency is particularly improved because the converting elements 29 have small light-receiving faces.

The stimulated emission M having passed through the second SELFOC lens array 26 is slightly mixed with the stimulating light L reflected by the surface of the panel 20, and hence the stimulating light L is removed by a stimulating light-cutting filter 27. The filter 27 does not transmit the stimulating light L but the stimulated emission M.

The stimulated emission M received by each converting element 29 is photoelectrically converted into signals S, which are then output into the image-reading means 30. In the image-reading means 30, the signals S are processed in consideration of the moving speed of the transferring belt 40 to obtain image data according to the position of the storage panel 20. Thus obtained image data are output on an image-processing apparatus (not shown).

Figure 3:
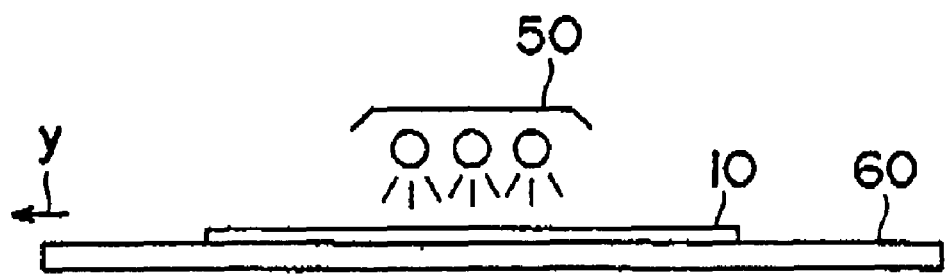
FIG. 3 is a sectional view schematically illustrating an example of the erasing unit in the radiation image-reading apparatus for performing the process of the invention.

FIG. 3 is a sectional view schematically illustrating an example of the erasing unit in the radiation image-reading apparatus for performing the process of the invention.

In FIG. 3, the storage panel 10 after the radiation image is read out is conveyed with a transferring belt 60 in the direction Y, and the whole surface of the panel is irradiated with easing light emitted from erasing means 50 placed right above the transferring belt 60.

Examples of the light source for easing light include known light sources such as a fluorescent lamp and a cold cathode tube. As described later, the amount of erasing light applied to the panel is preferably in the range of 40,000 to 90,0001 lx·s. For efficiently removing the radiation energy remaining in the storage panel, the storage panel 10 is exposed to the easing light through a filter (not shown). For example, the storage panel is first exposed to an erasing light through a W-cut filter, and then exposed to a light passing through a yellow acrylic filter (two-step erasing). Thus, the radiation energy remaining in the storage panel 10 is fully released as stimulated emission, and thereby the storage panel 10 is renewed for the use in the next recording and reproducing procedure.

The radiation image-reading apparatus used in the invention is not restricted to the embodiment shown in FIGS. 1 to 3. Each part of the apparatus (such as the light source, the light-collecting optical system between the light source and the panel, the optical system between the panel and the line sensor, and the line sensor) can have various known constitution.

As the line light source, a light source itself having a linear shape may be used. Further, a fluorescent lamp, a cold cathode fluorescent lamp and a LED (light-emitting diode) array can be also used. The line light source may produce the stimulating light either continuously or intermittently in the form of pulses.

The line sensor can consist of two or three rows of photoelectric converting elements, as well as the above-described single row of the elements. Further, according to the desired pixel size and the size of light-receiving face in each element, two or more elements may correspond to one pixel.

The radiation image storage panel is preferably transferred almost perpendicularly to the longitudinal direction of the line light source and the line sensor. However, as long as almost all of the surface of the panel is evenly exposed to the stimulating light, the panel may be transferred diagonally or along a zigzag line.

In the above embodiment, the optical path of the stimulating light L and that of the stimulated emission M are partly overlapped to give a compact apparatus. However, the path of the stimulating light L may be completely separated from that of the emission M. Further, in the above embodiment, the radiation image is read out while the storage panel is being transferred. However, the image may be read out while not the storage panel but the line light source and the line sensor are being moved parallel to the surface of the panel. If the storage panel has a transparent support, an additional line sensor can be placed on the bottom side in addition to the line sensor on the top side so that the emission can be detected from both top and bottom sides of the storage panel. Otherwise, in that case, the emission may be observed only from the bottom side.

In the above-mentioned reading system, the reading apparatus is equipped with the erasing unit. However, the erasing unit (i.e., erasing apparatus) can be separated from the reading apparatus. Further, an image-processing apparatus, in which image data signals output from the radiation image-reading apparatus are subjected to various signal processing, may be installed.

In the invention, the erasing performance of storage panel can be evaluated in terms of the erasing degree, which is measured in the following manner.

In the case where the radiation is X-rays, first the storage panel is exposed to X-rays in the exposure of a mR so as to store the X-ray energy, and then exposed the storage panel to a stimulating light to give off stimulated emission. The stimulated emission is detected to measure the initial amount of stimulated emission A. Second, after the storage panel is exposed again to X-rays in the exposure of b mR so as to store the X-ray energy, the storage panel is irradiated with an erasing light to remove the remaining energy. Thus treated panel is again exposed to a stimulating light in the same manner to give off stimulated emission. The stimulated emission is detected to measure the after-exposure amount of stimulated emission B.

The erasing degree (i.e., efficiency) of the storage panel is basically determined by the ratio of the after amount/initial amount (B/A). However, in consideration of the fact that the difference of the applied X-rays (b/a), the erasing degree can be defined as follows:

$$\text{erasing degree} = B/\{A \times (b/a)\}.$$

In the invention, the erasing degree is calculated under the conditions of a=20 mR and b=1,000 mR, which are derived from detection limit of the reading apparatus.

The erasing degree must be generally less than 0.01 since the human body has a transmittance of approx. 0.01 to X-rays.

In practical medical diagnoses on radiation images, the X-ray exposure widely varies according to what regions in the human body is examined. For example, for diagnosing inner organs such as the stomach, the exposure is approx. 300 mR. In contrast, the exposure is about 1 mR when external regions such as the fingers are diagnosed. In the following description, therefore, the erasing degree is explained in detail, by way of example, an such extreme case where, immediately after an image recorded and stored with 300 mR of X-rays is read out, another image is then recorded and stored with 1 mR of X-rays. For preventing the previously recorded image (i.e., ghost) from appearing in a reproduced radiation image, the previous image signals must be reduced to 1/300 or less. Accordingly, in this case, the required erasing degree is as follows:

$$\text{required erasing degree} < 0.01 \times (1/300) = 3.3 \times 10^{-5}$$

On the other hand, in the case where radiation images of relatively small X-ray exposures are repeatedly recorded and stored, namely, for example, in the case where an image of 1 mR is read out immediately after the previous X-ray image of 50 mR is obtained, the required erasing degree is as follows:

$$\text{required erasing degree} < 0.01 \times (1/50) = 2.0 \times 10^{-4}$$

Figure 4:
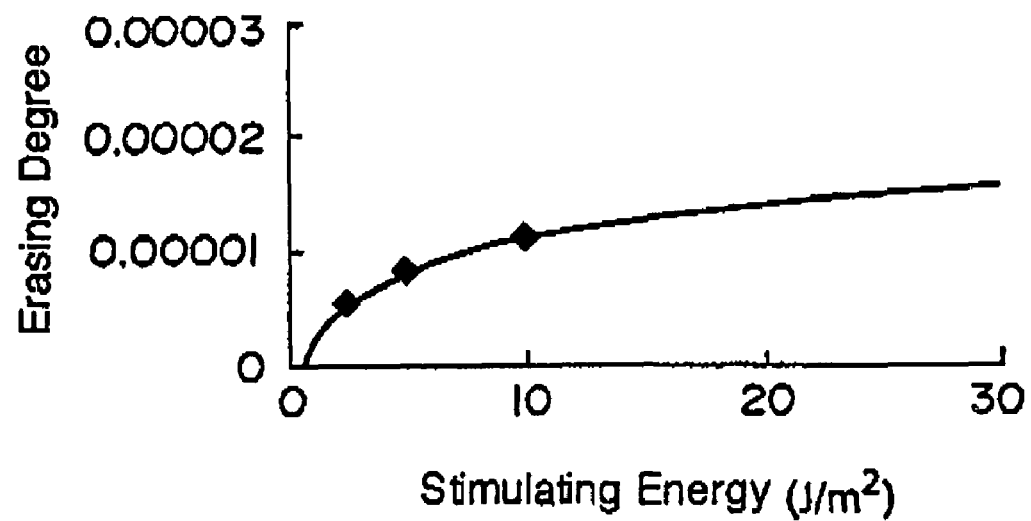
FIG. 4 is a graph showing a relation between the stimulating energy of a stimulating light and the erasing degree of a radiation image storage panel.

FIG. 4 is a graph showing a relationship between the stimulating energy of a stimulating light (laser beam) and the erasing degree of a radiation image storage panel (prepared in Example 1, described later) having a phosphor layer comprising columnar crystals of CsBr:0.001Eu phosphor. The amount of erasing light was 250,000 lx·s.

The graph in FIG. 4 indicates that the erasing degree varies a little in the region where the stimulating energy of laser beam is sufficiently high but remarkably decreases according as the stimulating energy lowers in the region where the stimulating energy is less than 10 J/m$^2$.

Figure 5:
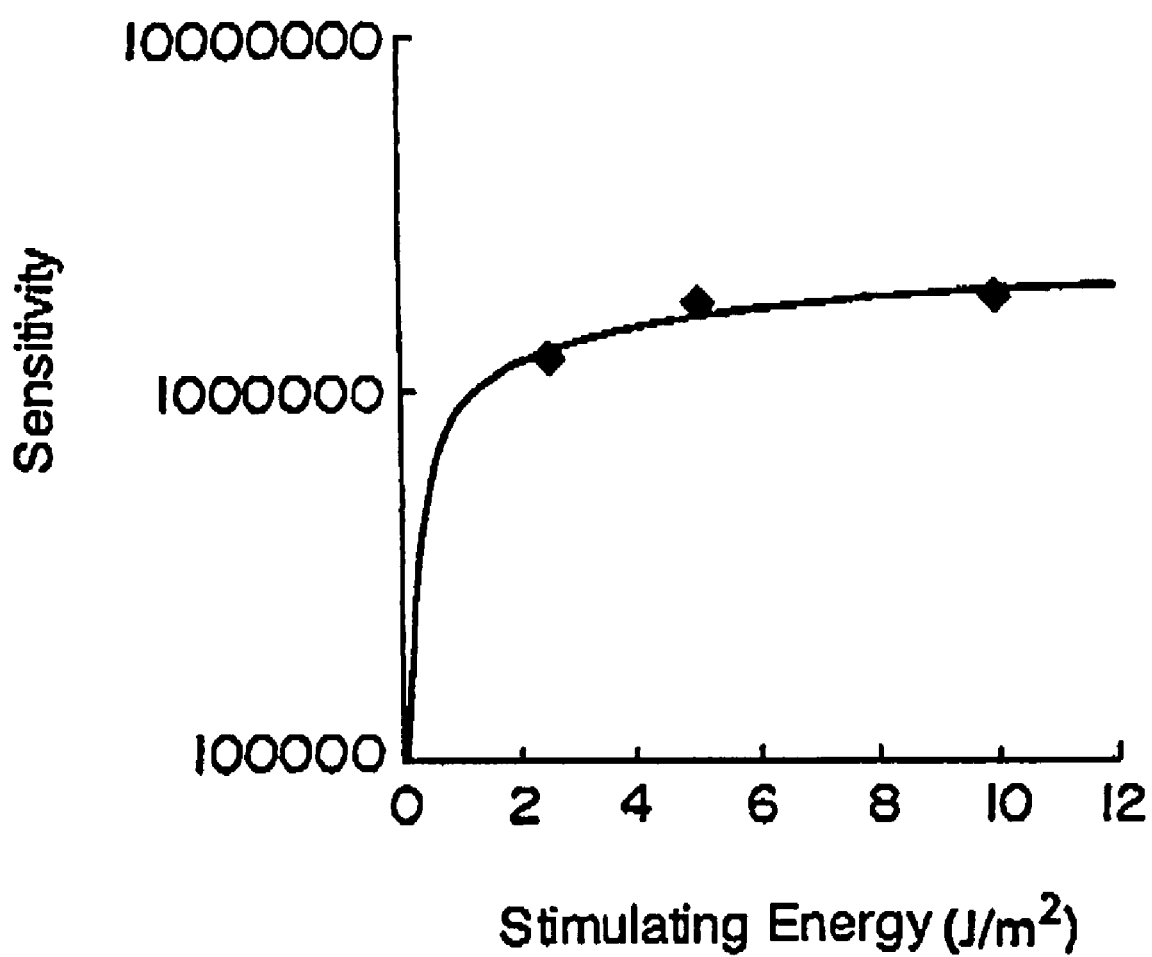
FIG. 5 is a graph showing a relationship between the stimulating energy of a stimulating light and the sensitivity (relative value) of a radiation image storage panel.

FIG. 5 is a graph showing a relationship between the stimulating energy of a stimulating light (laser beam) and the sensitivity (relative value, plotted on the logarithmic scale) of the storage panel having a phosphor layer comprising columnar crystals of CsBr:0.001Eu phosphor.

The graph in FIG. 5 indicates that the storage panel can have sufficiently high sensitivity when the stimulating energy is 2 J/m$^2$ or more.

Accordingly, if the storage panel in the read-out procedure is exposed to a stimulating light in a stimulating energy of 2 to 10 J/m$^2$, the erasing degree can be reduced (namely, the erasing performance can be improved) while the sensitivity of the panel is kept high enough.

Figure 6:
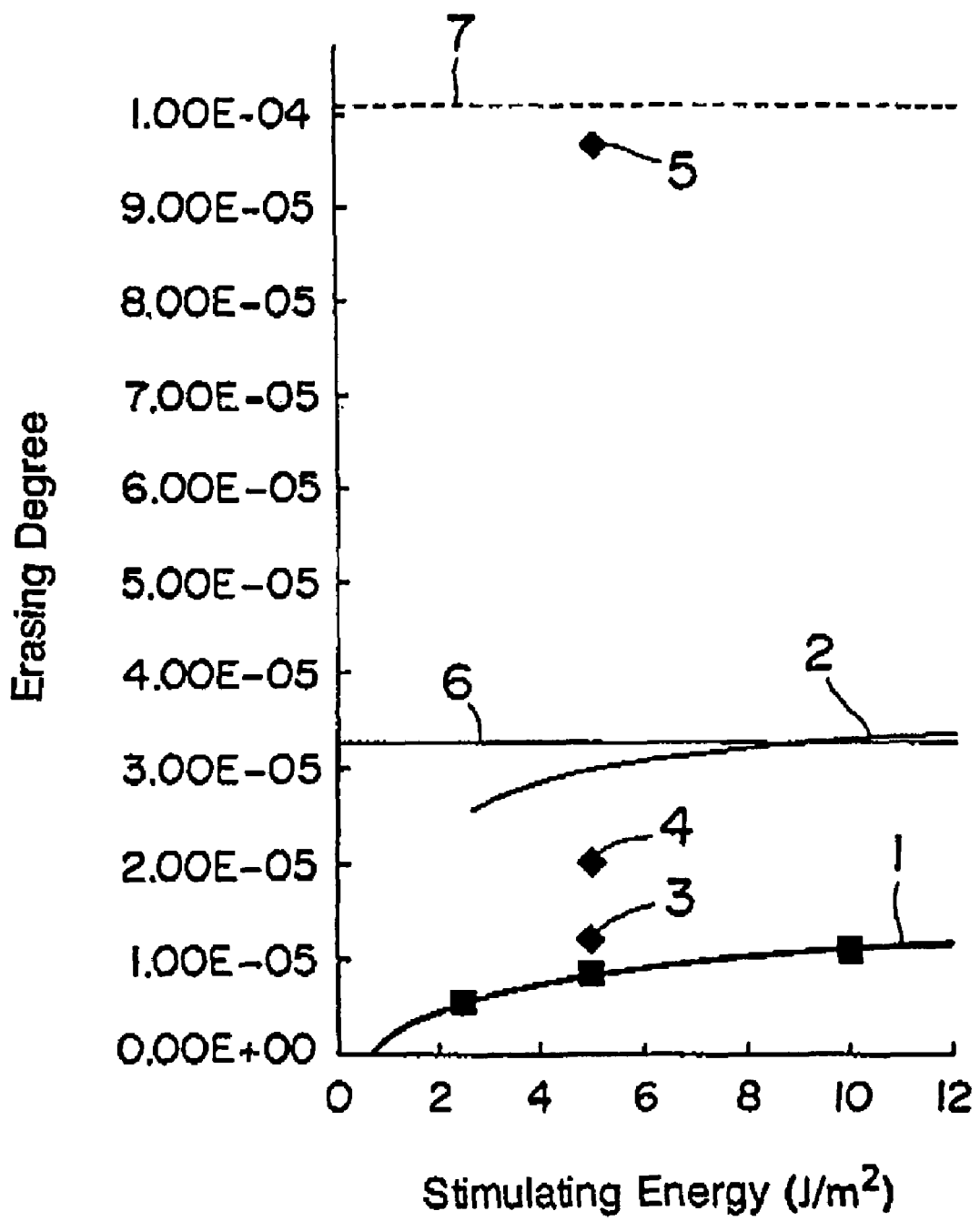
FIG. 6 is a graph showing relations between the stimulating energy of a stimulating light and the erasing degree of a radiation image storage panel.

FIG. 6 is a graph showing relationships between the stimulating energy of a stimulating light (laser beam) and the erasing degree of the storage panel having a phosphor layer of columnar crystals of CsBr:0.001Eu phosphor. The curve 1 shows a relationship when the amount of an erasing light was 250,000 lx·s, and the curve 2 shows the relationship when the amount of an erasing light was 90,000 lx·s. The plots 3 to 5 stand for the erasing degrees in the cases where the amounts of an erasing light were 200,000 lx·s, 100,000 lx·s and 50,000 lx·s, respectively (while the stimulating energy of laser beam was kept at 5 J/m$^2$). The solid and dotted lines 6 and 7 represent the required erasing degrees of 3.3×10-5 and 2.0×10$^{-4}$, respectively.

The graph in FIG. 6 indicates that the required erasing degree of 3.3×10$^{-5}$ in the aforementioned case of large exposure (300 mR–1 mR) can be obtained when the amount of an erasing-light is approx. 90,000 lx·s and that the required erasing degree of 2.0×10 in the above case of small exposure (50 mR-1 mR) can be obtained when the amount of erasing light is approx. 50,000 lx·s.

Accordingly, in the present invention, the image-recorded storage panel is exposed to a stimulating light in a stimulating energy of 2 to 10 J/M$^2$ and then irradiated with an rasing light in an amount of approx. 40,000 to 90,000 lx·s, and thereby the erasing degree can be controlled below the required level even if the exposure of X-ray varies.

EXAMPLE 1

(1) Preparation of Radiation Image Storage Panel

As the evaporation sources, powdery cesium bromide (CsBr, purity: 4N or more) and europium bromide (EuBr$_2$, purity: 3N or more) melt were prepared. In order to obtain the EuBr$_2$ melt, powdery europium bromide was placed in a platinum crucible and heated to melt at 800° C. in a tube furnace under enough halogen gas atmosphere to prevent oxidization. After the crucible was cooled to room temperature, it was taken out of the furnace to obtain the EuBr$_2$ melt. Each evaporation source was analyzed according to ICP-MS method (Inductively Coupled Plasma Mass Spectrometry), to detect impurities. As a result, the CsBr powder was found to contain each of the alkali metals (Li, Na, K, Rb) other than Cs in an amount of 10 ppm or less and other elements such as ala line earth metals (Mg, Ca, Sr, Ba) in amounts of 2 ppm or less. The EuBr$_2$ melt was also found to contain each of the rare earth elements other than Eu in an amount of 20 ppm or less and other elements in amounts of 10 ppm or less. The evaporation sources are very hygroscopic, and hence were stored in a desiccator keeping a dry condition whose dew point was −20° C. or below. Immediately before used, they were taken out of the desiccator.

An aluminum substrate (thickness: 1 mm, mill finished product, from Sumitomo Light Metal Industries, Ltd.) was mounted to a substrate holder in an evaporation-deposition apparatus. The CsBr and EuBr$_2$ evaporation sources were individually placed in crucibles equipped with resistance heaters, under the condition that the distance between the substrate and each evaporation source was set to 15 cm. After a main exhaust valve was opened, the apparatus was evacuated to make the inner pressure 1×10$^{-3}$ Pa by means a combination of a rotary pump, a mechanical booster and a diffusion pump. In this step, a moisture-exhaust cryo pup was used to remove atmospheric moisture. The main exhaust valve was closed and a by-path line was opened, so that Ar gas was introduced to set the inner pressure at 0.5 Pa. Ar plasma was generated by means of a plasma generator (ion gun), and thereby the surface of the substrate washed. After the by-path line was closed and the main exhaust valve was opened, the apparatus was again evacuated to make the inner pressure $1 \times 10^{-3}$ Pa. The main exhaust valve was closed and the by-path line was again opened, so that Ar gas was introduced to set the inner pressure at 1 Pa. The substrate was periodically moved so that the deposited layer would have an even thickness. While shutters placed between the substrate and the evaporation sources were closed, the evaporation sources were heated and melted by means of the resistance heaters. Only the shutter covering the CsBr source was first opened so that CsBr was alone accumulated on the substrate to form a layer of phosphor matrix. After 3 minutes, the shutter covering the $EuBr_2$ source was opened so that CsBr:Eu stimulable phosphor was accumulated on the matrix layer at the rate of 8 μm/minute. During the deposition, the electric currents supplied to the heaters were controlled so that the molar ratio of Eu/Cs in the stimulable phosphor would be 0.001/1.

After the evaporation-deposition was complete, the inner pressure was returned to atmospheric pressure and then the substrate was taken out of the apparatus. The substrate was placed in a treatment furnace, and subjected to heating treatment under $N_2$ gas atmosphere for 2 hours. On thus treated substrate, a deposited layer (thickness: approx. 600 μm, area: 20 cm×20 cm) consisting of columnar phosphor crystals aligned densely and almost perpendicularly was formed.

In this way, a radiation image storage panel comprising the support and the phosphor layer was produced by multi-vapor deposition (co-deposition).

(2) Process for Read-Out of Radiation Image

With respect to the obtained radiation image storage panel, the process for read-out of radiation image was carried out in the following manner. In the following procedures, the erasing degree of the panel was measured to evaluate the erasing property.

After the phosphor layer was of the storage panel was exposed to X-rays (80 kV, 20 mR), the phosphor layer was exposed to a stimulating light (laser beam emitted from a semi-conductor laser) of 660 nm so that the stimulating energy on the surface of the phosphor layer set to 5 J/m². The stimulated emission given of from the phosphor layer was detected with a point scanner (photomultiplier tube) to measure the amount of stimulated emission A. The phosphor layer was again exposed to X-rays (80 kV, 1,000 mR), and then irradiated with an erasing light emitted from a cold cathode tube so that the storage panel was subjected to the two-step erasing, in which the erasing light was applied first through a UV-cut filter (N-169, Nitto Plastics Industries, Ltd.) and second through a yellow acrylic filter (N-039, Nitto Plastics Industries, Ltd., ratio of surface area between the former and latter filters: 3:2) to the whole surface of the phosphor layer. The amount of the erasing light was 250,000 lx·s. After the erasing step was complete, the phosphor layer was exposed to the laser beam in the X same manner as above. The stimulated emission given off from the phosphor layer was detected with the point scanner to measure the amount of stimulated emission B. From the obtained values A, B and X-ray exposures, the erasing degree of $(B/\{A \times (1000/20)\}$ defined hereinbefore was calculated. Further, the stimulating energy of semi-conductor laser beam was changed, and the same procedures were repeated to obtain each erasing degree shown in FIGS. 4 to 6.

FIG. 4 is a graph showing a relationship between the stimulating energy of laser beam and the erasing degree of the storage panel.

FIG. 5 is a graph showing a relationship between the stimulating energy of laser beam and the sensitivity (relative value, corresponding to the amount of stimulated emission A) of the storage panel.

FIG. 6 is a graph showing relations between the stimulating energy of laser beam and the erasing degree of the storage panel. The curve 1 shows the relationship when the amount of erasing light was 250,000 lx·s, and the curve 2 shows the relation when the amount of erasing light was 90,000 lx·s. The plots 3 to 5 stand for the erasing degrees in the cases where the amounts of erasing light were 200,000 lx·s, 100,000 lx·s and 50,000 lx·s, respectively (while the stimulating energy of laser beam was kept at 5 J/m²). For example, the plot 5 means that the erasing a degree was $9.68 \times 10^{-5}$ when the amount of erasing light was 90,000 lx·s. The solid and dotted lines 6 and 7 represent the required erasing degrees of $3.3 \times 10^{-5}$ and $2.0 \times 10^{-4}$, respectively.

The graphs in FIGS. 4 and 5 indicate that, if the recorded image is read out of the storage panel with a stimulating light in a stimulating energy of 2 to 10 J/m², the erasing degree can be so reduced that the erasing property can be improved while the sensitivity is kept high enough.

The graph in FIG. 6 indicates that both required erasing degrees $3.3 \times 10^{-5}$ in the large exposure (300 mR-1 mR) and $2.0 \times 10^{-4}$ in the small exposure (50 mR-1 mR) can be obtained if the remaining energy was erased with erasing light in an amount of 40,000 to 90,000 lx·s. This means that unfavorable radiation energy remaining in the storage panel can be well erased even if the exposure of X-ray variously varies.

What is claimed is:

1. A process for recording and reproducing a radiation image, comprising the steps of:

exposing a radiation image storage panel, which comprises a phosphor layer comprising columnar crystals of europium activated cesium halide stimulable phosphor, to a radiation having passed through an object or having radiated from an object, whereby a radiation image information of the object is temporarily recorded in the storage panel;

exposing the storage panel to a stimulating light in a stimulating energy of 2 to 10 J/m² to emit a stimulated emission;

photoelectrically collecting the stimulated emission; and converting the collected emission into a radiation image in the form of a series of electric image signals.

2. The process of claim 1, which flirther comprises a step for erasing energy remaining in the radiation image storage panel from which the radiation image is read out by irradiating the storage panel with an erasing light of 40,000 to 90,000 lx·s.

3. The process of claim 1, wherein the europium activated cesium halide stimulable phosphor is represented by the formula of CsBr:Eu.

4. The process of claim 1, wherein the stimulating light is a laser beam.

5. The process of claim 1, wherein the step of photoelectrically collecting the stimulated emission is performed by means of a line sensor composed of plural photoelectric converting elements arranged in line.

* * * * *